United States Patent [19]

Suzuki et al.

[11] Patent Number: 4,689,092
[45] Date of Patent: Aug. 25, 1987

[54] BRAZING FLUX

[75] Inventors: Kenichi Suzuki; Fusayoshi Miura; Fumio Shimizu, all of Aichi, Japan

[73] Assignee: Kabushiki Kaisha Toyota Chuo Kenkyusho, Japan

[21] Appl. No.: 905,320

[22] PCT Filed: Dec. 23, 1985

[86] PCT No.: PCT/JP85/00705

§ 371 Date: Aug. 22, 1986

§ 102(e) Date: Aug. 22, 1986

[87] PCT Pub. No.: WO86/04007

PCT Pub. Date: Jul. 17, 1986

[30] Foreign Application Priority Data

Jan. 11, 1985 [JP] Japan .................................. 60-3689

[51] Int. Cl.$^4$ ................................................ B23K 35/36
[52] U.S. Cl. ....................................... 148/26; 228/248
[58] Field of Search .......................... 148/26; 228/248

[56] References Cited

U.S. PATENT DOCUMENTS

| 3,951,328 | 4/1976 | Wallace | 148/26 |
| 3,971,501 | 7/1976 | Cook | 228/248 |
| 4,131,493 | 12/1978 | Gurevich | 148/26 |
| 4,475,960 | 10/1984 | Yamawaki | 148/26 |
| 4,579,605 | 4/1986 | Kawase | 148/26 |
| 4,619,716 | 10/1986 | Suzuki | 148/26 |

Primary Examiner—Peter D. Rosenberg
Attorney, Agent, or Firm—Berman, Aisenberg & Platt

[57] ABSTRACT

A flux for brazing material comprising cesium fluoroaluminate or a mixture thereof with aluminum fluoride, and having an aluminum fluoride/cesium fluoride molar ratio of 67/33 to 26/74.

15 Claims, 9 Drawing Figures

TEMPERATURE (°C)

Co-Kα (DEGREE)

TEMPERATURE (°C)

Co-Kα 2θ (DEGREE)

BRAZING FLUX

BACKGROUND OF THE INVENTION

1. Field of the Invention

This invention relates to a flux used in brazing an aluminum material, i.e. aluminum or an aluminum alloy.

2. Description of the Prior Art

When an aluminum material is brazed, it has been usual to employ as a brazing alloy a eutectic alloy of aluminum and silicon having a melting point which is somewhat lower than that of the aluminum material. In order to bond the brazing alloy to the aluminum material satisfactorily, it is necessary to remove all contaminants, such as an oxide film, from the surface of the aluminum material. A flux is used for that purpose. There has recently come to be used a non-corrosive flux composed of a $KF\text{-}AlF_3$ complex. This substance melts at the eutectic point of $KF\text{-}AlF_3$ and exhibits an excellent flux action. It is, however, at a temperature of 560° C. or above that this flux begins to melt. It is, therefore, necessary to use a brazing alloy having a melting point which is several tens of degrees higher than 560° C., and employ a correspondingly high brazing temperature. When a torch is used as a source of heat for brazing, a high temperature is difficult to control. Therefore, the use of the $KF\text{-}AlF_3$ flux requires a high degree of skill and experience.

Anothe drawback of this flux is that it is not very effective as a flux for brazing an aluminum material containing magnesium.

SUMMARY OF THE INVENTION

It is, therefore, an object of this invention to provide a brazing flux which has a low melting point, and which is effective for brazing an aluminum material containing magnesium, too.

This object is attained by a flux which comprises at least one cesium fluoroaluminate complex and has an fluoride ($AlF_3$)/cesium fluoride (CsF) molar ratio aluminum of 67/33 to 26/74.

The flux of this invention melts at a temperature of about 450° C. to remove any oxide film or other foreign matter from the surface of an aluminum material and promote the uniform flow and distribution of a brazing alloy. It enables the satisfactory brazing of even an aluminum material containing magnesium, as it does not form any substance that may hinder the flow of a brazing alloy. The flux remaining on the brazed material does not corrode it or the brazing alloy. Therefore, the brazed product need not be cleansed.

DETAILED DESCRIPTION OF THE INVENTION

The flux of this invention comprises at least one cesium fluoroaluminate complex composed of cesium (Cs), aluminum (Al) and fluorine (F). The complex is referred to as cesium fluoroaluminate in this invention, and includes a series of substances, such as $Cs_3AlF_6$, $CsAlF_4$ and $Cs_2AlF_5 \cdot H_2O$. A lot of different complexes exist among those known as cesium fluoroaluminate. There also exist a lot of complexes of the same composition which differ from one another in sructure, depending on temperature.

Figure 1:
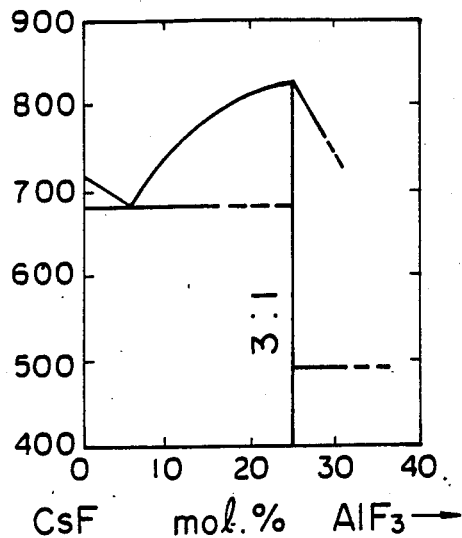
FIG. 1 is a phase diagram of the system $CsF\text{-}AlF_3$.

FIG. 1 is a phase diagram of the system $C_2F$ - $AlF_3$ [Zeitschrift fuer Anorganische und Allgeneine Chemie, 81,357 (1913)]. As is obvious from FIG. 1, these complexes are very complicated in structure, and the phase diagram of any complexes containing more than 25 mol % of $AlF_3$ is not clearly known.

The melting point of the flux according to this invention depends on the molar ratio of $AlF_3/CsF$. If the molar ratio of $AlF_3/CsF$ is in the range of 67/33 to 26/74, the flux melts, or begins to melt, at a temperature of 440° C. to 480° C. The flux having an $AlF_3/CsF$ molar ratio within the range hereinabove stated is not deliquescent, as it does not contain any free CsF. It does not absorb any moisture, even if it may be left in the open air before or after brazing. Therefore, it does not corrode the aluminum material.

If the molar ratio of $AlF_3/CsF$ is in the range of 26/74 to 50/50, the flux is composed of cesium fluoroaluminate. The whole quantity of the complex serves as a flux and exhibits a particularly excellent effect as a flux.

If the molar ratio is in the range of 50/50 to 67/33; the flux is a mixture of cesium fluoroaluminate and aluminum fluoride ($AlF_3$). The presence of $AlF_3$ does, however, not present any problem, since it is nonhygroscopic and hard to dissolve. If the molar ratio exceeds 67/33, however, the flux contains so large a proportion of $AlF_3$ that a brazing alloy may fail to flow satisfactorily with a resultant reduction in brazing efficiency.

If the molar ratio is lower than 25/75, the composition contains free CsF and has a melting point of about 685° C. It is, therefore, difficult to use as a flux. Its melting point can, however, be lowered to a range of 440° C. to 560° C. if it is mixed with a conventional $KF\text{-}AlF_3$ flux.

The flux of this invention can be produced by a variety of methods as will hereunder be described by way of example. According to a first method, the powders of CsF and $AlF_3$ are mixed in an appropriate ratio, and after their mixture has been melted in a crucible, it is cooled into a solid. Then, the solid is crushed to provide a flux. It is advisable to employ a relatively large quantity of $AlF_3$ when preparing the mixture, since $AlF_3$ is likely to decrease by sublimation when the mixture is melted.

According to a second method, water is added to an appropriate mixture of CsF and $AlF_3$ powders to form a paste or slurry and the paste or slurry is left at ordinary temperature for a long time, or at a temperature not exceeding 100° C. for about an hour, , and aged. cured. The gradual reaction of $AlF_3$, which is hard to dissolve in water, and CsF, which is soluble in water, forms cesium fluoroaluminate. This method enables the formation of cesium fluoroaluminate or a mixture of cesium fluoroaluminate and $AlF_3$ without causing any loss of CsF.

According to a third method, aluminum hydroxide [$Al(OH)_3$] or metallic aluminum is dissolved in an aqueous solution of hydrogen fluoride or cesium hydroxide (CsOH). The resulting solution is neutralized with an aqueous solution of hydrogen fluoride or cesium hydroxide which has not been used for dissolving aluminum hydroxide or metallic aluminum, whereby cesium fluoroaluminate is produced.

According to a fourth method, $Al(OH)_3$ and CsOH are mixed in an aqueous solution of hydrogen fluoride and the resulting solution is stirred to cause the reaction of Al, Cs and F to form cesium fluoroaluminate.

The aqueous solution containing the reaction product obtained by the second, third or fourth method may be used directly as a flux. Alternatively, the precipitation is collected from the solution by a filter and dried at a temperature which is lower than its melting point.

The flux of this invention can be used for brazing in accordance with a conventional method. The flux in powder form is dispersed in a solvent, such as water or alcohol, and the resulting paste, slurry or suspension is applied to an appropriate portion of an aluminum material by brushing, spraying or dipping. The flux preferably has a particle size not exceeding 20 or 30 microns.

Then, a brazing alloy is fed to that brazing desired portion of the material. It is appropriate to use a brazing alloy having a melting point which is about 10° C. to 100° C. higher than that of the flux. It is usual to use a eutectic alloy of aluminum and silicon having a silicon content of 7 to 12 % by weight (e.g., an alloy designated by Japanese Industrial Standard as A4343 or A4047). It is, however, possible to use also an alloy having a lower melting point, for example, an Al-Si-Cu alloy designated by JIS as A4145 which begins to melt at a temperature of about 521° C., or an Al-Si-Cu-Zn alloy which begins to melt at about 516° C.

Then, that portion of the material to be brazed is heated by a torch, or furnace. If a furnace is used, it is preferably filled with a non-oxidizing atmosphere, such as nitrogen, though a furnace filled with air can also be employed. The flux first melts and reacts with $Al_2O_3$ on the surface of the aluminum material to remove it therefrom. This reaction takes place even on an aluminum material containing magnesium. The melted flux does not react with aluminum. As the temperature further rises, the brazing alloy melts and the molten alloy flows smoothly on the surface of the aluminum material to form a satisfactory joint at that portion of the material which is to be joined to another material.

As the flux of this invention has a lower melting point than any conventional $KF-AlF_3$ flux, it enables the use of a lower brazing temperature and the realization of a higher brazing efficiency. It also facilitates the use of a torch for brazing. It is not clear why the flux of this invention is also effective for brazing an aluminum material containing magnesium. It is, however, possible that due to its lower melting point, the flux of this invention prevents the vaporization of magnesium from the aluminum material before the brazing alloy begins to flow, or that it may dissolve away any magnesium fluoride (MgF) that would otherwise prevent the flow of the brazing alloy. There is no necessity for cleansing the brazed material since the remain of the flux after brazing does not corrode the aluminum material and the brazing alloy.

The invention will now be described more specifically with reference to a plurality of examples.

EXAMPLE 1

Figure 2:
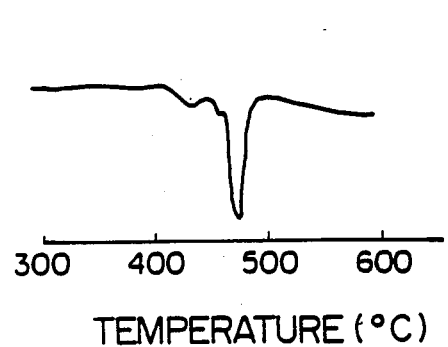
FIG. 2 is a DTA curve obtained from a flux according to EXAMPLE 1.
Figure 3:
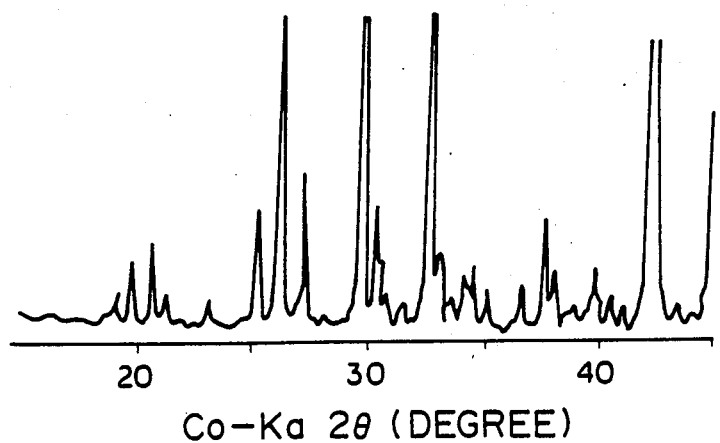
FIG. 3 is an X-ray diffraction pattern of the flux according to EXAMPLE 1.

Cesium fluoride and aluminum fluoride were mixed in molar ratios as shown at Run Nos. 1 to 3 in TABLE 1. Each of the resulting mixtures was melted in a crucible having a stream of nitrogen and the solidified product thereof was crushed into a powder having a particle size not exceeding 200 mesh to yield a flux embodying this invention. Each flux was subjected to differential thermal analysis (DTA) and diffraction by Co-Kα rays. FIGS. 2 and 3 show by way of example the results obtained from Run No. 1. As is obvious therefrom, the flux has a melting point of about 480° C. and is a complex salt having a complicated structure. The melting point of each flux is shown in TABLE 1. The diffraction patterns obtained from Run Nos. 2 and 3 indicate that these fluxes are also complexes having complicated structures.

Figure 4:
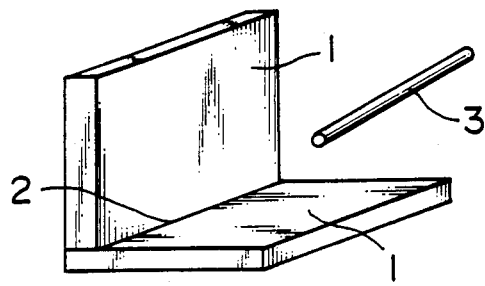
FIG. 4 is a perspective view of the materials brazed in EXAMPLE 1.

Each flux was tested for brazing as will hereunder be described. Water was added to the flux to form a slurry and the slurry was applied to the materials to be joined. More specifically, the slurry of the flux 2 was applied to an area of contact between two sheets 1 of an aluminum alloy designated by JIS as A3003, as shown in FIG. 4. Each sheet 1 had a width of 2 cm, a length of 3 cm and a thickness of 3 mm and was secured to the other sheet by a jig not shown. One end of a brazing alloy wire 3 designated by JIS as A4047, having a diameter of 2 mm, and to which a similar slurry had been applied, was brought into close proximity to the corner between the two sheets 1, and the heat of an oxygen-acetylene flame produced by a torch burner not shown was applied thereto for brazing the two sheets. The brazing alloy penetrated the contacting portions of the two sheets satisfactorily and formed a satisfactory brazed joint therebetween. The brazed product was left in ion exchange water having a temperature of 50° C. for two weeks, but did not show any trace of corrosion.

For comparative purposes, fluxes having an $AlF_3/CsF$ molar ratio of 23/77 and 70/30, respectively (Run Nos. C-1 and C-2) and a flux having an $AlF_3/KF$ molar ratio of 45/55 (Run No. C-3) were prepared, and tested for brazing as hereinabove described. The melting of all of these comparative fluxes required a higher temperature which was difficult to control properly, and it was difficult to obtain a uniformly brazed joint by any of these fluxes. The flux shown at Run No. C-2 did not allow the satisfactory flow of a brazing alloy.

TABLE 1

| Run No. | $AlF_3/CsF$ (mol ratio) | Melting point (°C.) | Results of brazing |
|---|---|---|---|
| 1 | 26/74 | 485 | Satisfactory |
| 2 | 40/60 | 482 | " |
| 3 | 67/33 | 450 | " |
| C-1 | 23/77 | 700 or higher | Unsatisfactory |
| C-2 | 70/30 | 450 | Partly unsatisfactory |
| C-3 | $AlF_3/KF$ = 45/55 | 560 | " |

EXAMPLE 2

Figure 5:
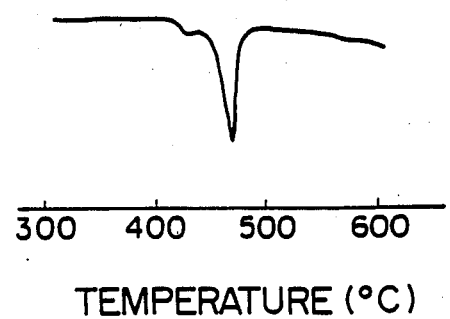
FIG. 5 is a DTA curve obtained from a flux according to EXAMPLE 2.
Figure 6:
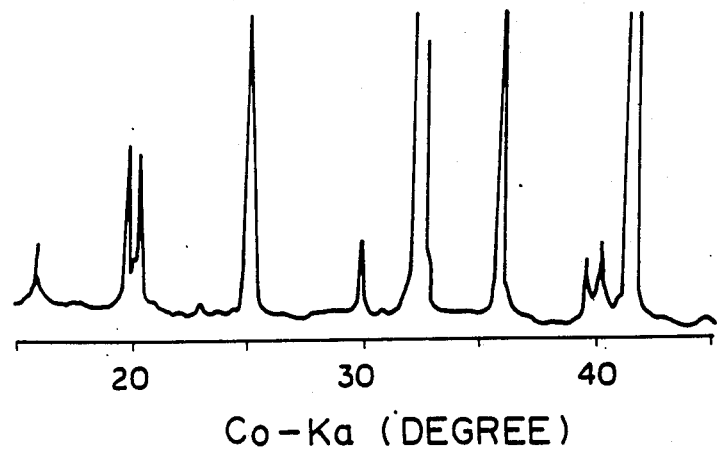
FIG. 6 is an X-ray diffraction pattern of the flux according to EXAMPLE 2.

Cesium fluoride and aluminum fluoride were mixed in the molar ratios shown at Run Nos. 4 to 6 in TABLE 2. 200 cc of water was added to 100 g of each mixture, and after they had been carefully mixed, the mixture was dried at 200° C. for an hour. The resulting solid was crushed to form a flux embodying this invention. Each flux was examined by DTA and X-ray diffraction. TABLE 2 shows the melting point of each flux obtained from its DTA curve. The results of X-ray diffraction indicated that each flux was a complex having a complicated structure, and not containing any CsF. The DTA curve of the flux according to Run No. 5 and the results of its diffraction by Co-Kα rays are shown by way of example in FIGS. 5 and 6, respectively.

Figure 7:
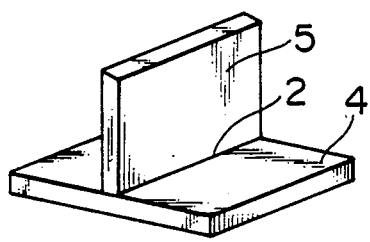
FIG. 7 is a perspective view of the materials employed in EXAMPLE 2 to 4.

Each flux was tested for brazing as will hereunder be described. A 3 cm square, 1 mm thick sheet 4 of an aluminum alloy containing 1.2% by weight of magnesium (designated by JIS as A3004) and a 3 cm square, 1.6 mm thick brazing sheet 5 clad with an aluminum alloy containing 7% by weight of silicon (designated by JIS as BA12PC) were degreased with trichloroethylene, and supported as shown in FIG. 7 to prepare a test sample. An aqueous suspension containing 10% by weight of the flux was prepared, and after the test sample had been dipped in the suspension, removed therefrom and dried, it was heated at 610° C. for two minutes in a brazing furnace filled with a nitrogen atmosphere.

Comparative fluxes were prepared as shown at Run Nos. C-4 to C-6 in TABLE 2, and tested for brazing.

Each flux according to this invention enabled the formation of a fillet having a uniform width along a joint 2 between the sheets 4 and 5. On the other hand, comparative flux C-4 enabled the formation of only a fillet lacking uniformity in width, and the fillet formed in the presence of the comparative flux C-5 was still more unsatisfactory in width uniformity. Comparative flux C-6 did not allow any appreciable flow of a brazing alloy, and yielded a defective brazed product.

TABLE 2

| Run No. | $AlF_3/CsF$ (mol ratio) | Melting point (°C.) | Results of brazing |
|---|---|---|---|
| 4 | 26/74 | 485 | Satisfactory |
| 5 | 40/60 | 482 | " |
| 6 | 67/33 | 450 | " |
| C-4 | 23/77 | 700 or higher | Partly unsatisfactory |
| C-5 | 70/30 | 450 | " |
| C-6 | $AlF_3/KF = 45/55$ | 560 | Unsatisfactory |

EXAMPLE 3

An aqueous solution containing 0.1 mol of each of CsOH and Al(OH)$_3$ and 0.4 mol of HF in one liter of water was heated and the residue obtained after vaporization of the water was dried at 200° C. The resulting solid was crushed to form a flux embodying this invention (Run No. 7).

One (1.0) mol of CsOH and 2.0 mols of HF were dissolved in one liter of water and 0.3 mol of a foil of aluminum having a purity of at least 99.3% by weight was further dissolved therein. The solution was left for precipitation and the resulting precipitation was collected by filtration and washed in water to prepare a flux embodying this invention (Run No. 8).

Figure 8:
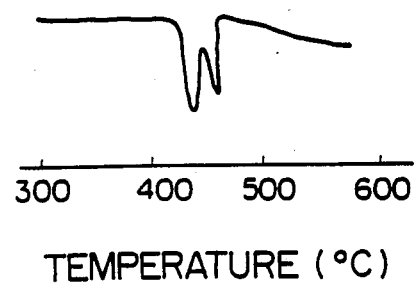
FIG. 8 is a DTA curve obtained from a flux according to EXAMPLE 3.
Figure 9:
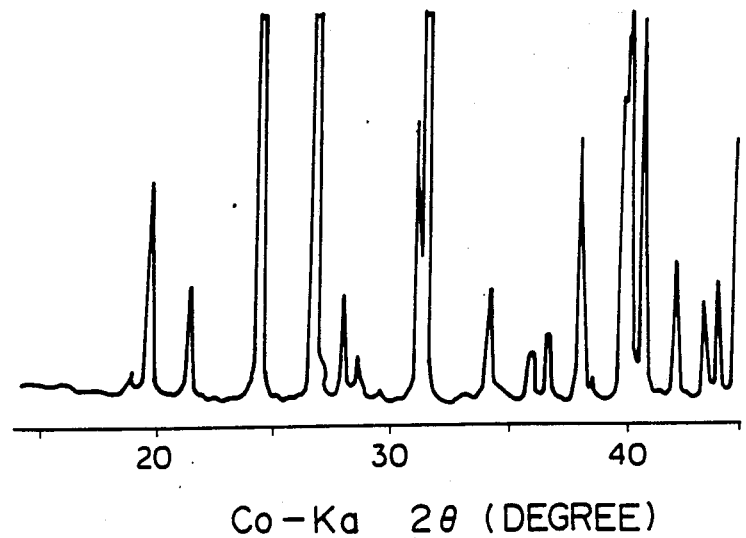
FIG. 9 is an X-ray diffraction pattern of the flux according to EXAMPLE 3.

The flux according to Run No. 7 had a melting point of 445° C. and the flux according to Run No. 8 had a melting point of 455° C. The results of diffraction by Co-Kα rays indicated that these fluxes were both a complex not containing any CsF. The DTA curve of the flux according to Run No. 7 and the results of its diffraction are shown in FIGS. 8 and 9, respectively. The procedure of EXAMPLE 2 was repeated for testing these fluxes for brazing. Both of them enabled the formation of a satisfactory fillet having a uniform width.

EXAMPLE 4

A series of brazing tests were conducted by employing a variety of different aluminum materials and brazing alloys as shown at Run Nos. 9 to 13 in TABLE 3 and a flux prepared as will hereunder be described. One mol of Al(OH)$_3$ was dissolved in one liter of an aqueous solution containing 4 mols of HF to prepare an aqueous solution I. One mol of CsOH was dissolved in 500 g of water to prepare an aqueous solution II. The solutions I and II were mixed, and after water had been removed by vaporization, the mixture was crushed to prepare a flux embodying this invention. A pair of aluminum materials which were each 3 cm square and 1 mm in thickness were held as shown in FIG. 7 to prepare a test sample for each of Runs Nos. 9 to 13. A brazing alloy strip having a length of 3 cm, a width of 0.5 cm and a thickness of 0.2 mm and coated with the flux was laid along a junction between the two sheets. The whole was placed in a brazing furnace filled with nitrogen and held for two minutes at the temperature shown in TABLE 3.

A fillet having a uniform width was obtained in all of Run Nos. 9 to 11 and 13. A satisfactorily brazed joint was also obtained in Run No. 12 despite a fillet lacking uniformity in width to some extent.

TABLE 3

| Run No. | Aluminum material | Brazing alloy | Brazing temp. (°C.) |
|---|---|---|---|
| 9 | A1050 (JIS) | Al—7% Si | 610 |
| 10 | A2017 (JIS) | Al—75% Zn | 500 |
| 11 | A3004 (JIS) | Al—10% Si—4% Cu—10% Zn | 580 |
| 12 | A5052 (JIS) | " | " |
| 13 | A6061 (JIS) | Al—75% Zn | 500 |

What is claimed is:

1. A flux for brazing an aluminum material and comprising at least one cesium fluoroaluminate complex, said flux being essentially free from unreacted CsF and having an aluminum fluoride/cesium fluoride molar ratio of from 67/33 to 26/74.

2. A flux according to claim 1, wherein said flux further comprises aluminum fluoride and has the aluminum fluoride/cesium fluoride molar ratio of 67/33 to 50/50.

3. A flux according to claim 1, wherein said flux consists essentially of at least one cesium fluoroaluminate complex and has an aluminum fluoride/cesium fluoride molar ratio of 50/50 to 26/74.

4. A flux according to claim 1, wherein said cesium fluoroaluminate complex is selected from Cs$_3$AlF$_6$, CsAlF$_4$ and Cs$_2$AlF$_5$.H$_2$O.

5. A flux according to claim 4 comprising Cs$_3$AlF$_6$.

6. A flux according to claim 4 comprising CsAlF$_4$.

7. A flux according to claim 4 comprising Cs$_2$AlF H$_2$O.

8. A flux according to claim 1 which consists essentially of the cesium fluoroaluminate complex or a mixture thereof with aluminum fluoride.

9. A flux according to claim 8, wherein the aluminum fluoride/cesium fluoride molar ratio is from 67/33 to 50/50.

10. In brazing an aluminum material with a flux, the improvement wherein the flux is flux according to claim 1.

11. In brazing an aluminum material with a flux, the improvement wherein the flux is flux according to claim 2.

12. In brazing an aluminum material with a flux, the improvement wherein the flux is flux according to claim 3.

13. In brazing an aluminum material with a flux, the improvement wherein the flux is flux according to claim 4.

14. In brazing an aluminum material with a flux, the improvement wherein the flux is flux according to claim 8.

15. In brazing an aluminum material with a flux, the improvement wherein the flux is flux according to claim 9.

* * * * *